(12) United States Patent  (10) Patent No.: US 8,290,876 B1
Powell  (45) Date of Patent: Oct. 16, 2012

(54) METHOD AND SYSTEM FOR SECURING A THIRD PARTY PAYMENT ELECTRONIC TRANSACTION

(76) Inventor: Steven Douglas Powell, Catonsville, MD (US)

( * ) Notice: Subject to any disclaimer, the term of this patent is extended or adjusted under 35 U.S.C. 154(b) by 0 days.

(21) Appl. No.: 13/005,259

(22) Filed: Jan. 12, 2011

(51) Int. Cl.
*G06Q 20/00* (2012.01)
(52) U.S. Cl. ............................................ 705/64; 705/75
(58) Field of Classification Search ................ 705/50–79
See application file for complete search history.

(56) References Cited

U.S. PATENT DOCUMENTS

| | | | |
|---|---|---|---|
| 7,734,527 B2 * | 6/2010 | Uzo | 705/37 |
| 2002/0069155 A1 * | 6/2002 | Nafeh et al. | 705/37 |
| 2005/0283444 A1 * | 12/2005 | Ekberg | 705/67 |

* cited by examiner

*Primary Examiner* — Calvin L Hewitt, II
*Assistant Examiner* — Thomas West
(74) *Attorney, Agent, or Firm* — Rosenberg, Klein & Lee

(57) ABSTRACT

A method and system are provided for securing a third-party payment electronic transaction, allowing a customer to seal a self-issued electronic voucher and thereby finalize a payment amount; such electronic voucher is then transmitted to a vendor and then forwarded to a payor for approval and payment or to a creditor in satisfaction of a debt.

20 Claims, 15 Drawing Sheets

METHOD AND SYSTEM FOR SECURING A THIRD PARTY PAYMENT ELECTRONIC TRANSACTION

BACKGROUND OF THE INVENTION

1. Field of the Invention

The present invention is generally directed to a method and system for securing a third-party payment electronic transaction. More specifically, the present invention is directed to a method and system for providing for the integrity of electronic transactions between at least a customer, a payor, and a payee or vendor.

2. Description of the Related Art

In many financial or consumer transactions, it is increasingly necessary to provide security and to ensure that transactions are bona fide and properly authorized. There are many benefits to using third party payment devices, such as credit cards, for transactions; however, there are many shortcomings, dangers, and additional liability exposures to the parties involved, including: a payor or financial institution (used interchangeably herein), a vendor, seller, giftee, merchant, or payee (used interchangeably herein), and a customer, purchaser, beneficiary, or buyer (used interchangeably herein).

Conventionally, a buyer would seek to use cash, check, a credit card, or other third party payment device with a vendor or merchant to make a purchase. In the case of a credit card, a buyer is presented with a receipt, invoice, or check (used interchangeably herein) and the buyer generally signs the receipt, potentially adding a tip. Once the receipt has been signed, a vendor or merchant submits the receipt or purchase amount to a payor or financial institution. One of the vulnerabilities in that case is that the buyer must rely on the honesty and integrity of the vendor that the amount submitted to the payor is indeed the amount that the buyer has approved. However, this may not be the case. The vendor or merchant may instead specify an incorrect amount either intentionally or accidentally.

For example, while the buyer might have agreed to a $50.00 purchase price, either through error, or deceptive intent, a vendor may submit a bill for $500.00 or even $5,000.00 to a payor or financial institution. The buyer may never notice this unless they vigilantly inspect their periodic statements. Even if the buyer does notice the discrepancy, the buyer may still be exposed to over-limit charges, accrued interest, penalties for other transactions refused due to the unintended transaction, a reduced credit score, and many other negative consequences.

In some transactions, such as on-line purchases or telephone purchases, a credit card is not even seen by a merchant or vendor and, in some instances, merely the credit card number is provided. Therefore, anyone who comes across a credit card number could potentially use the credit card to purchase anything up to the creditor's purchase limit. In such a transaction, there is the enhanced possibility of fraud by the purchaser and/or the vendor.

Fraud or overcharges are even possible in an instance where the physical card is presented, for example: where a purchaser or buyer may go out to dinner and specify a tip in a certain amount to the waiter. Such a waiter or waitress is free to later modify the specified tip amount and submit that to the payor or financial institution in whatever amount they desire. This kind of fraud and abuse is virtually unchecked—requiring pro-active scrutiny and diligence on the part of the buyer.

Countless such nefarious frauds and abuses are possible in the conventional credit card transaction paradigm, limited only by the ingenuity of the fraudulent party. In the past, there have been many ineffective attempts to make credit card transactions more secure.

Card issuers have printed cards with ultraviolet-only ink and added card verification codes, which take the form of additional digits that are not embossed or raised from the card surface but are only visible to a holder of the card. Another method of securing cards has been to require the input of a billing zip code or a pin code. A more basic security measure has been requiring the signature of a cardholder when using the card.

However, neither these nor any other measures heretofore known provide sufficient security to a purchaser. Once a cardholder has given his credit card number and expiration date to a merchant, the merchant is afforded ample opportunity to charge any amount up to the credit limit of the card and the purchaser may not discover this at all unless they thoroughly inspect their statement from the credit card company and they happen to notice a discrepancy. There simply is no readily available means for a purchaser to specify an amount and lock that amount in such that a merchant or vendor is unable to tamper with the amount. Still further, anyone who gains possession of a purchaser's credit card may, for the most part, freely use that credit card number to make fraudulent purchases. There is therefore a need for a method and system for securing a third-party payment electronic transaction.

SUMMARY OF THE INVENTION

An object of the present invention is to provide a system and method for securing a third-party payment electronic transaction.

Another object of the present invention is to provide a system and method for a purchaser to issue an electronic voucher redeemable by a vendor or merchant.

Another object of the present invention is to provide a system and method for allowing a purchaser to finalize and seal a purchase amount autonomously and independently of a vendor.

It is yet another object of the present invention to provide a system and method for improving the security of credit card transactions.

It is yet another object of the present invention to provide a system and method for reducing fraud and abuse in electronic transactions.

It is yet another object of the present invention to provide a system and method for facilitating secure electronic transactions, largely using existing infrastructure.

It is yet another object of the present invention to provide a system and method for facilitating payment by a cell phone or customer transaction device, utilizing barcodes or wireless transmission to transmit an electronic voucher to a vendor.

These and other objects are attained by a method implemented in accordance with the present invention.

The method includes establishing a third party payment relationship between a payor and a customer and a programmably configured transaction device for the customer. An electronic transaction token is delivered from the payor to the customer transaction device. A customer selectively actuates the customer transaction device to generate a local validation code based on customer-possessed information including at least: the electronic transaction token and transaction amount. The transaction amount is then validated for payment from the payor to the payee upon the payor independently generating a remote validation code for the customer based at least on the electronic transaction token and transaction amount.

A system implemented in accordance with the present invention serves to effectively secure a third-party payment electronic transaction. The system generally comprises a payor processor, operable to establish a third party payment relationship between the payor and a customer, deliver an electronic transaction token from the payor to the customer, and independently generate a remote validation code for the customer based at least on the electronic transaction token and a transaction amount. The system further includes a programmably configured customer transaction device operable to generate a local validation code based on customer-possessed information including at least: the electronic transaction token and transaction amount and a payee point of sale processor, operable to receive the local validation code from the customer transaction device and transmit the local validation code and a transaction amount to a payor.

From yet another aspect, a method generally includes providing a customer transaction device, a payee point-of-sale processor, and a third-party payor processor, and establishing a customer identifier with the third-party payor processor, generating and storing at least one transaction token associated with the customer identifier on the third-party payor processor, and providing the at least one transaction token to the customer transaction device. At least the transaction token and a transaction amount are computed to form a local validation code and the validation code is combined with at least a customer identifier to form an electronic voucher on the customer transaction device. The Electronic voucher is then transmitted from the customer transaction device to the payee point-of-sale processor and the payee point-of-sale processor then transmits at least a transaction amount, and the electronic voucher to the third-party payor processor. The third party payor processor retrieves at least one stored transaction token according to the customer identifier, computes the at least one retrieved transaction token and the transaction amount to form a remote validation code; and, signaling the payee point-of-sale processor responsive to an evaluation of the local validation code to the remote validation code.

DESCRIPTION OF THE PREFERRED EMBODIMENTS

In the field of secure transactions, and specifically, in the purchase of goods and services, it is particularly important to ensure the integrity of transactions, and provide security against fraud and abuses.

In accordance with an embodiment of the present invention, a system and method for securing a third-party payment electronic transaction is provided where the method includes establishing a relationship between a payor and a customer and providing the customer with a transaction device. An electronic transaction token is delivered from the payor to the customer transaction device. A customer operates the customer transaction device to generate a local validation code based on at least: the electronic transaction token and a transaction amount. The transaction amount is then validated for payment from the payor to the payee upon the payor independently generating a remote validation code for the customer based at least on the electronic transaction token and transaction amount.

Figure 1:
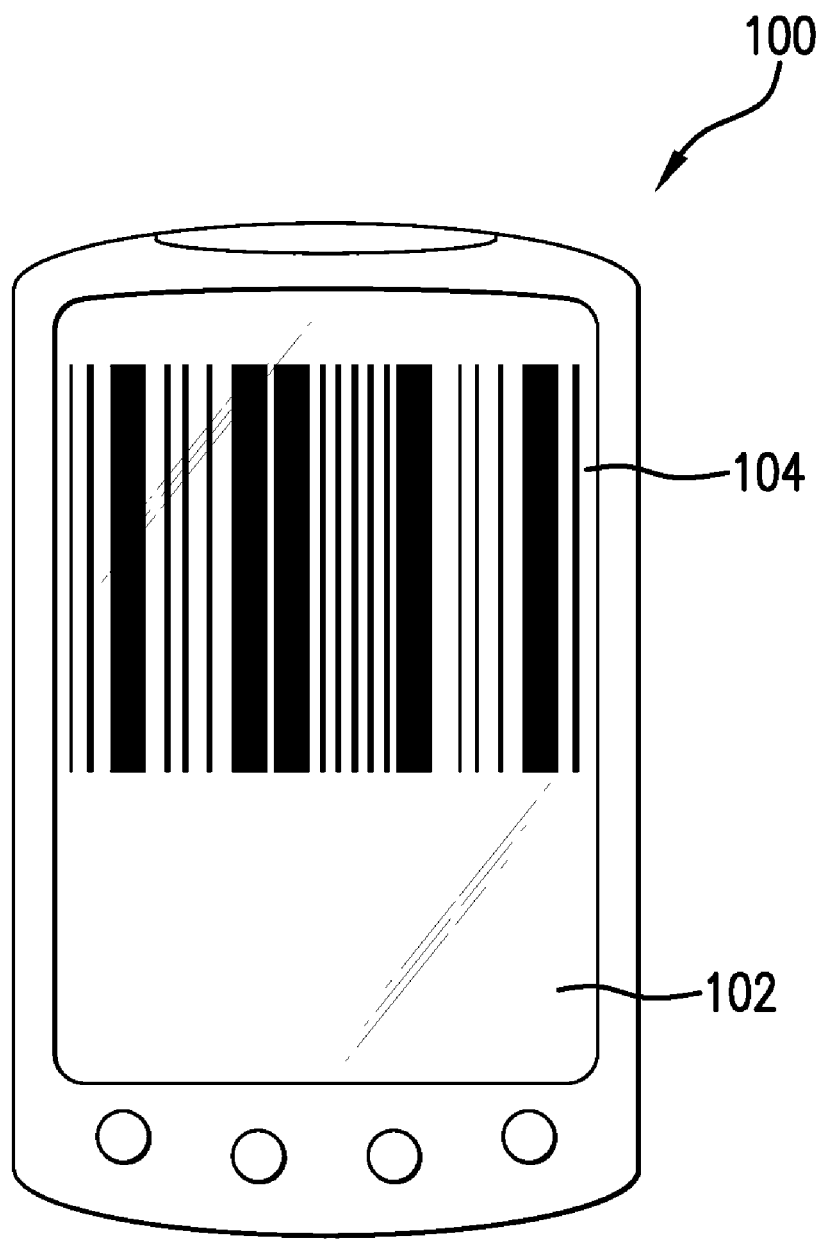
FIG. 1 is a perspective view of an exemplary embodiment of a customer transaction device for transmitting an electronic voucher to a vendor point-of-sale system.

FIG. 1 illustrates an exemplary customer transaction device, which could take the form of a personal digital assistant (PDA), smart phone, cell phone, notebook, laptop, tablet, home computer, or any suitable digital device being able to process, store, and transmit information.

Preferably, the customer transaction device 100 has a screen such as a liquid crystal display (LCD), organic light emitting diode (OLED), plasma, e-ink, e-paper, transflective, pixel-qi, or any other display of suitable type capable of outputting information or images to a user or vendor. Preferably, this customer transaction device 100 displays on its screen 102 a barcode 104 encoding a credit card number and other customer information to be shared with a vendor or merchant to pay for goods or services.

By using a cell phone or PDA as a customer transaction device 100, an additional device is not required and the ubiquity of cell phones and other handheld digital devices is leveraged to allow purchasers the use of a secured third-party payment electronic transaction method and system in accordance with the present invention.

The customer transaction device 100, however, is not limited to transmitting a credit card, account, electronic voucher, or third party payment information to a merchant solely with screen 102. Such a customer transaction device may communicate the electronic voucher to the merchant or vendor with a wireless radio such as wireless LAN (Wi-Fi), Bluetooth, infrared strobe, visible strobe, audible tones, a Zigbee transceiver, a haptic modulator, a Radio Frequency Identification Device (RFID) transceiver, or a Near Field Communication (NFC) transceiver. Indeed, any suitable transmission device known to one skilled in the art may be substituted or used in combination with any of the above to communicate with a vendor.

Ideally, the customer transaction device is secured against unauthorized use, potentially by a password, pin, unlock pattern, or biometrics, for example in the form of face recognition, fingerprint recognition, or iris recognition. The customer transaction device is preferably equipped with at least one processor, memory, and an interfacing bus interconnecting the memory and processor with peripheral devices and/or input/output devices.

In an exemplary embodiment of a method in accordance with the present invention, a purchaser takes an item to be purchased such as a laptop or a loaf of bread to a cashier and is provided with an amount due. The purchaser authenticates to the customer transaction device that the purchaser is an authorized user through suitable measures such as a personal identification number (pin), password, or biometrics, and then initiates a secure payment application.

The secure payment/transaction application may require a further pin, password, or biometric authentication (or may simply rely on the device's built-in security measures), and then may allow a user to select a specific account used for payment. A purchaser may then enter the purchase price amount received from the vendor and, to complete the transaction, the purchaser may merely present the customer transaction device to the vendor. A barcode encoding the transaction information is preferably displayed on the screen to the vendor which is then scanned by a scanner. Preferably, a charge coupled device (CCD) scanner is used; however, a laser scanner may perform suitably in combination with an e-ink, e-paper, or transflective type display.

This transaction information or electronic voucher may be transmitted to the vendor through other means such as a Bluetooth, Wi-Fi, or near field communication (NFC). In the given example, however, barcodes are preferably transmitted to the CCD scanner to leverage existing infrastructure as barcode scanners are ubiquitous at many point-of-sale or checkout registers. As other technologies emerge, such as Near Field Communication (NFC) terminals, they may prove to be a more preferred manner of transmitting such information to the vendor.

Figure 2:
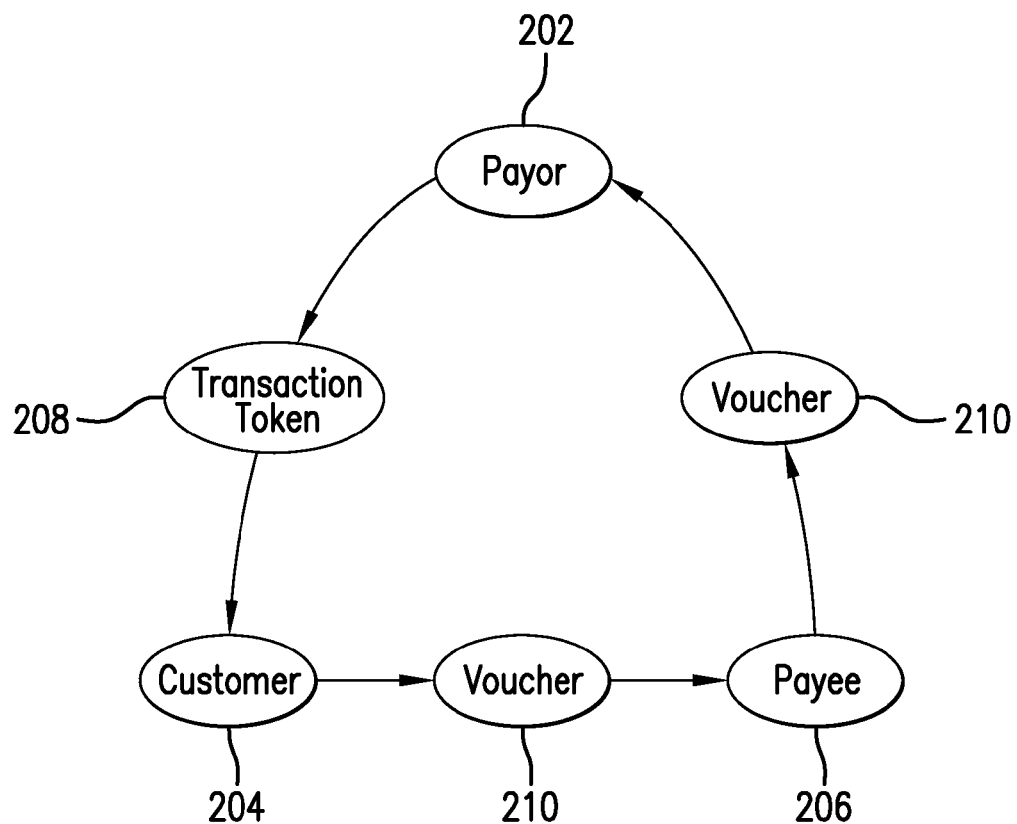
FIG. 2 is a schematic diagram of a system in accordance with an exemplary embodiment of the present invention.

FIG. 2 is a schematic diagram of a third party payment structure incorporated in a method 200 for securing a third-party payment electronic transaction in accordance with one aspect of the present invention. A payor, financial institution, or bank 202 instantiates a customer account and an account identifier or customer number associated with that account. The payor or financial institution then instantiates at least one transaction token 208—a unique, potentially random, number generated with sufficient length or digits to ensure its uniqueness, and prevent, or hinder falsification or forgery.

The payor or financial institution 202 transmits this transaction token 208 to the customer 204. The customer 204 may be the customer transaction device. If the customer is already aware of the purchase amount, the customer creates an electronic voucher by concatenating or combining their account number or customer identification number with the purchase amount and a local authentication code formed by computing, encrypting, digesting, or hashing the combination of the transaction token and the purchase amount. If a vendor was to modify the purchase amount transmitted in plaintext, then the local authentication code would not match the modified purchase amount—and the electronic voucher would be fatally flawed.

Optionally, and to provide more security, the local authentication code portion of the computed electronic voucher may also contain a personal identification number or pin; an account number or customer identifier; a vendor identification number to uniquely identify a vendor; a transaction type specifier such as: credit hold, credit purchase, and credit refund; and/or a salt, or injection of random numbers to increase security.

The customer either has apriori knowledge of the purchase amount or is informed of this amount by the vendor. The customer transaction device then either hashes, encrypts, or computes, preferably using a hash-based message authentication code (HMAC) employing a secure hashing algorithm SHA-1, SHA-2, SHA-3, MD5sum, or any hashing algorithm that provides suitable security and uniqueness of digest. The customer transaction device then combines a plain text representation of a customer identifier or account number with a purchase amount and the local authentication code which may preferably be the hashed or computed concatenation of at least the purchase amount and token.

Preferably, the local authentication code of the hashed or computed transaction token and purchase amount is suitably truncated to 18 or 20 characters to accommodate and fit within standard electronic data interchange (EDI), American National Standards Institute (ANSI), or International Organization for Standardization (ISO) formatting for credit card transmission from vendor to payor. This preferably allows vendors to receive the electronic voucher from the customer transaction device and use existing messaging protocols and hardware to transmit such to a payor without changes to the existing infrastructure. This beneficially allows adoption of such a secure system without additional investment in infrastructure.

Once the customer identifier and purchase amount are combined with the suitably-truncated hashed or computed local authentication code, the customer transaction device employs suitable measures such as a barcode generator or image driver to generate a suitable representation of the electronic voucher, such as barcodes in compliance with standard barcode formatting. In the case of barcodes, the barcode generator transmits this information to the display. As each barcode may only transmit a finite, and generally small amount of information, preferably a series of barcodes are displayed sequentially following standard timing formatting so as to enable a charge coupled device (CCD) scanner at a point-of-sale (POS) system to receive and decode the visual barcode-based transmission of the electronic voucher. Alternatively, a higher information density barcode, such as a 2-dimensional (e.g. datamatrix, QR-code) may be employed.

Such an electronic voucher created by the customer transaction device may preferably include two parts: 1) an uncomputed, raw, or plain-text representation of an account number and an amount; and 2) the local authentication code which is the computed, encrypted, or hashed combination of at least the transaction token and the amount.

This electronic voucher 210 is transmitted to the payee, vendor, or merchant 206. Such a transmission from the customer 204 to the payee 206 may be accomplished as discussed supra, for example via barcodes or wireless transmission.

If the customer 204 included the purchase amount in the plaintext portion of the electronic voucher 210, the payee 206 merely retransmits this electronic voucher 212 to the payor 202 for approval or to initiate payment to the payee of the purchase amount. Otherwise, the payee or vendor inserts the purchase amount into the plaintext portion of the electronic voucher. For the voucher to be valid, the payee or vendor must insert the same amount that is encoded in the local authentication code portion of the electronic voucher.

The payor 202 or financial institution receives the electronic voucher that was transmitted to it in step 212. The payor then strips off the customer identifier or account number to locate the transaction token, preferably through a look-up table or a database.

The payor computer or processor then preferably performs the same hashing, encrypting, or computation that was performed on the customer transaction device on at least the plaintext (purported) purchase amount and at least the first transaction token assigned to the account identifier or customer identifier. Potentially, the payor may perform a symmetric function, or a complementary function depending on the type of computing performed on the customer transaction device. Thereby, the payor 202 generates a remote authentication code. The payor may then compare the remote authentication code (computed in-house with the known token and a plaintext or purported purchase amount) to the local authentication code computed by the customer transaction device 204. As long as the remote authentication code computed by the payor matches (or otherwise signals agreement with) the local authentication code computed by the customer transaction device, then the payor may safely assume that the customer's transaction token was used in the computation with an agreed-upon purchase amount and may then authorize the purchase. If, however, any changes have been made to the plaintext or purported purchase amount after the computation of the local authentication code on the customer transaction device, then the payor's remote authentication code will not match the customer transaction device's local authentication code—and a forgery or fraud will be apparent.

Figure 3:
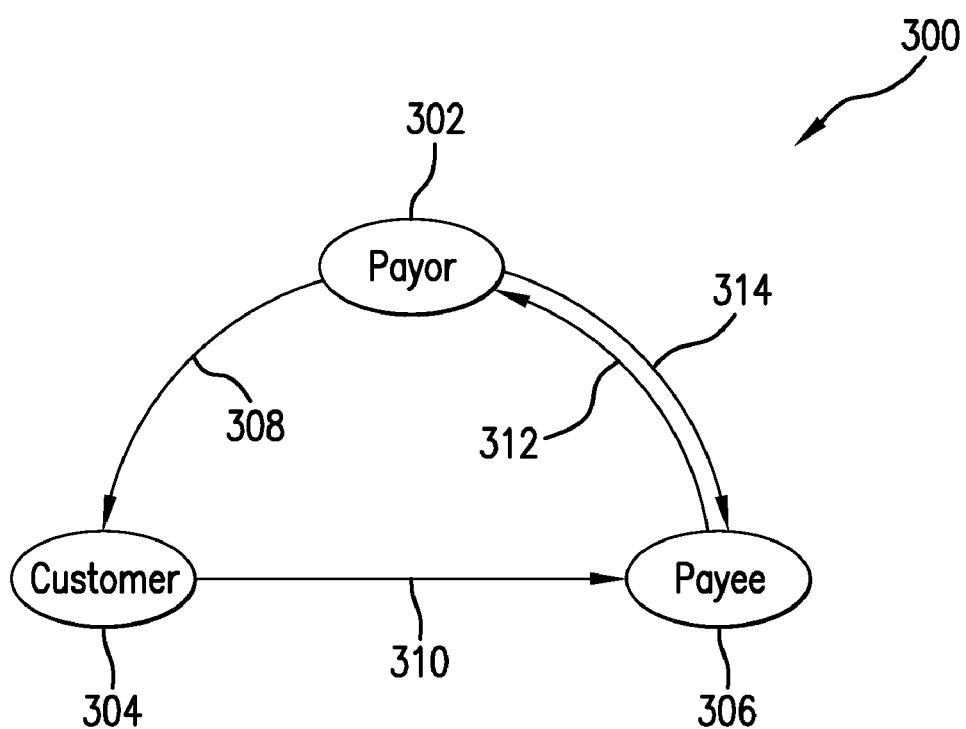
FIG. 3 is a schematic diagram of a system in accordance with another exemplary embodiment of the present invention.

FIG. 3 is a simplified schematic diagram of a method and system for securing a third-party payment electronic transaction in accordance with an alternate embodiment of the invention of the subject Patent Application. System and method 300 includes a payor 302 generating a transaction token and transmitting the transaction token 308 to the customer 304. Customer 304 receives the transaction token and preferably hashes the transaction token with an intended purchase amount to form the local authentication code which is then combined with a plaintext representation of the customer identifier and the purchase amount to form an electronic voucher.

The electronic voucher is transmitted 310 to the payee 306. Payee 306 determines whether the electronic voucher indicates an amount of purchase and if so merely forwards on the electronic voucher 312 to the payor. If, however, the customer has not transmitted in plaintext the transaction amount (it is merely hashed into the authentication code portion of the electronic voucher) the payee then appends to the electronic voucher a purported purchase amount and transmits this 312 to the payor. The payor 302 partitions the electronic voucher into fields including the account number (which is used to reference the transaction token), the purported purchase amount (plain text representation) and the hashed combination of the intended purchase amount and the transaction token. The payor is then able to use this in a computation or hash function on an outstanding transaction token which it has stored a copy of and the purported purchase amount. If indeed the remotely hashed transaction token and purported purchase amount is equal to the local authentication code portion of the electronic voucher then the payor 302 authorizes or approves payment 314 back to the payee.

Figure 4:
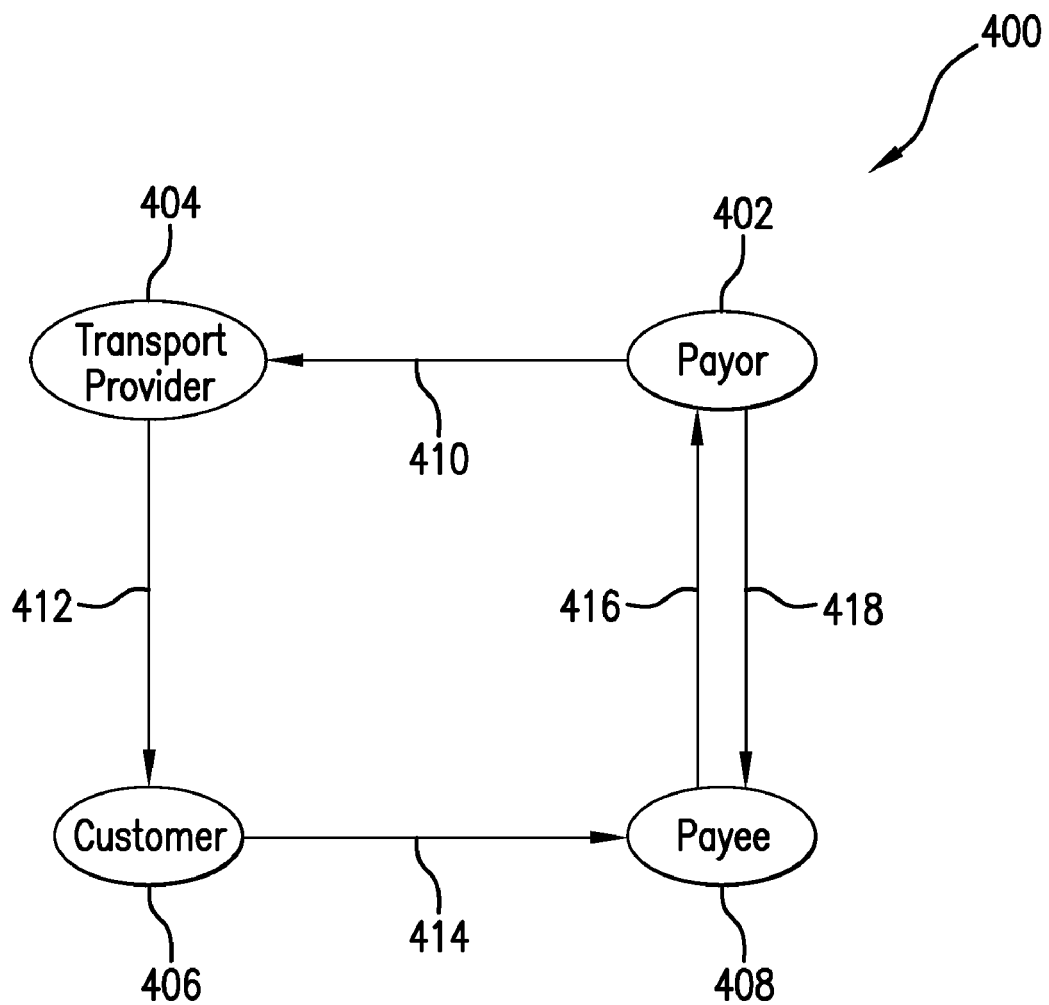
FIG. 4 is a schematic diagram of a system in accordance with another exemplary embodiment of the present invention.

FIG. 4 is a schematic diagram of a method and system for securing a third-party payment electronic transaction in accordance with another embodiment of the invention of the subject Patent Application. That method and system 400 include a transport provider 404 acting as an intermediary between the payor and the customer to deliver a transaction token and optionally account information. In this embodiment, payor 402 generates the transaction token and transmits this 410 to the transport provider 404 which may be a telephone network operator, internet service provider, or some other trusted transport intermediary.

Transport provider 404 then transmits the transaction tokens and potentially, other account information, 412 to customer 406. Customer 406 computes, creates and issues an electronic voucher and transmits this electronic voucher 414 to the payee 408. Payee 408 then transmits the electronic voucher 416 to the payor 402 and then, provided that the electronic voucher's purported amount is equal to the intended amount contained in the local authentication code portion of the electronic voucher, then the payor 402 authorizes, or approves payment 418 to the payee 408.

Transport provider 404 may use any delivery method as known in the art suitable for transmitting secure messages from a banking or financial institution through the transport provider to a customer's transaction device. For example, transport provider 404 may use a Multimedia Messaging Service (MMS) format or a Short Message Service (SMS). Preferably the transport provider 404 would use some type of encryption or other means to ensure the security of the transmitted tokens. Still further, transport provider 404 would use measures to ensure integrity and timeliness of message delivery.

Figure 5:
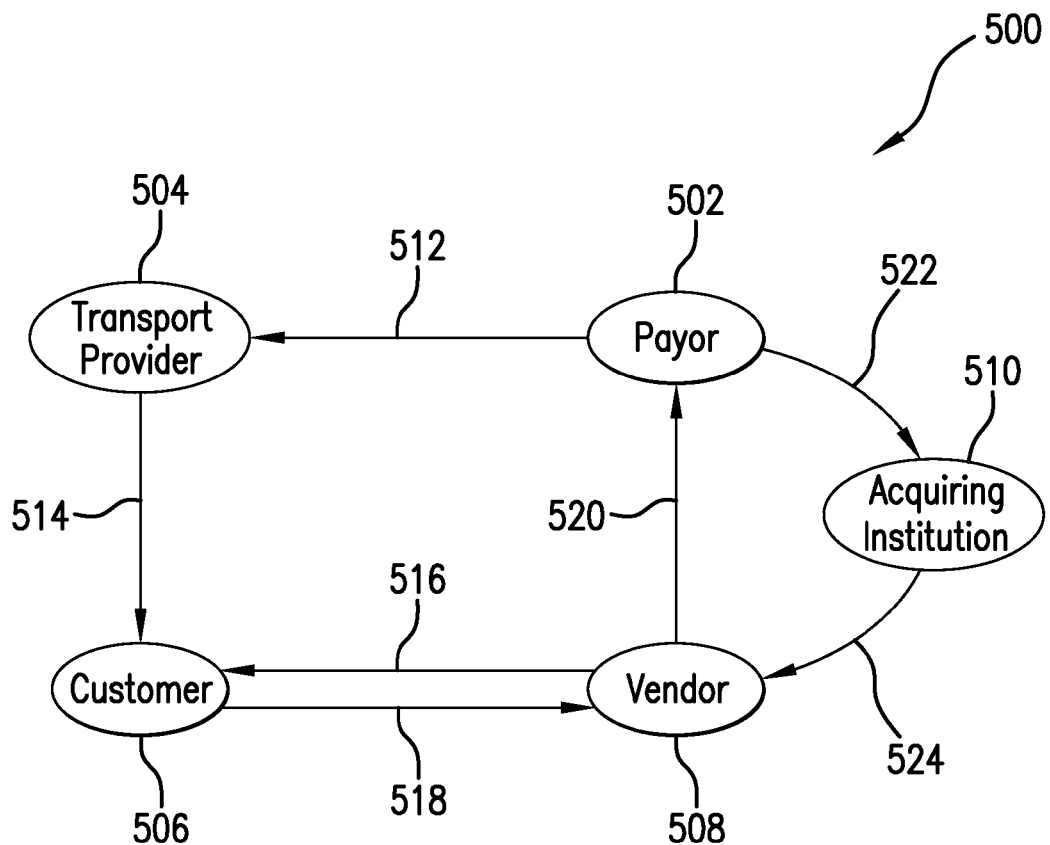
FIG. 5 is a schematic diagram of a system in accordance with another exemplary embodiment of the present invention.

FIG. 5 is a schematic diagram of a method and system for securing third-party payment electronic transaction in accordance with another embodiment of the invention of the subject Patent Application. The method and system 500 show payor 502 transmitting a transaction token (or a plurality) 512 to transport provider 504. Transport provider 504 provides the transaction token messages 514 through any suitable means, such as SMS or MMS to customer 506. Customer 506 then creates and issues an electronic voucher 518 and transmits that to the vendor 508.

It is during the steps of issuing the electronic voucher that the customer has sealed and finalized the transaction amount to be paid from the payor to the vendor. Once the customer has sealed and finalized by issuing an electronic voucher having a local authentication code, the transaction amount is unalterable and may not be tampered with or inflated by a vendor or any third-party. Thereby the customer is ensured that they will be charged only the amount they intended to be charged.

In this exemplary embodiment, vendor 508 may provide 516 the customer 506 not only with a transaction amount, but also potentially a vendor ID. The customer 506 may use this transaction amount as well as the vendor ID in the computation and creation of the local authentication code for the electronic voucher. In this instance, the electronic voucher would be vendor specific as it would only work with the vendor indicated by the vendor ID. Alternatively, the payor or financial institution may receive the vendor ID in plain text from the vendor along with the electronic voucher. The payor may then have safeguards to ensure that payment is only paid to an entity associated with the specified vendor ID.

Vendor 508, after receiving the electronic voucher 518, then transmits this electronic voucher 520 on to the payor 502. Payor 502 ensures the validity of the electronic voucher, as discussed supra through comparison of authentication codes.

Payor 502, then, responsive to an affirmative indication of validity, signals approval of the transaction 522 to the vendor's acquiring institution 510, which may take the form of vendor's bank, financial institution, or credit card company. Acquiring institution 510 then either forwards the approval 524, or transmits payment to the vendor 508.

Figure 6:
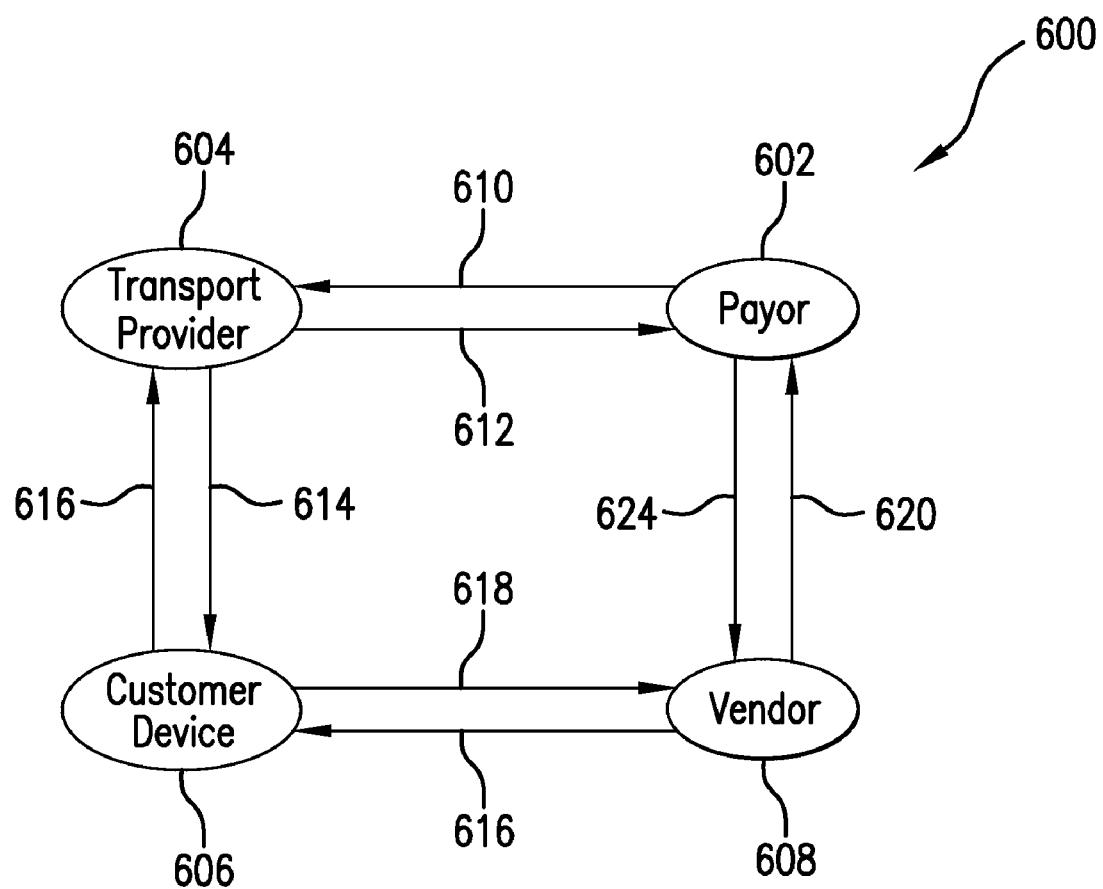
FIG. 6 is a schematic diagram of a system in accordance with another exemplary embodiment of the present invention.

FIG. 6 is a schematic diagram of a method and system for securing a third-party payment electronic transaction in accordance with another embodiment of the invention of the subject Patent Application. Method and system 600 include a payor 602 issuing at least one transaction token at step 610 to the transport provider 604. Transport provider 604 then transmits a confirmation 612 to the payor 602 that it has received the transaction token. Alternatively, transport provider 604 then transmits the transaction token 614 to the customer device 606. Customer device 606 then replies to the transport provider with an acknowledgement of receipt of the transaction token 616. Transport provider then forwards or re-forwards the acknowledgement of receipt of the transaction token 612 to the payor 602. Customer transaction device 606, after acknowledging 616, then issues the electronic voucher 618 to the vendor after receiving at least a transaction amount from the vendor. This transmission of transaction amount, and potentially vendor ID, may be accomplished by electronic transmission, cash register display, or merely the vendor verbally informing or telling the customer the purchase amount price and the vendor ID.

Vendor 608, upon receiving the electronic voucher 618, transmits the electronic voucher 620 to the payor 602 who, upon verifying the validity thereof, signals approval of the transaction 624 to the vendor 608.

Figure 7:
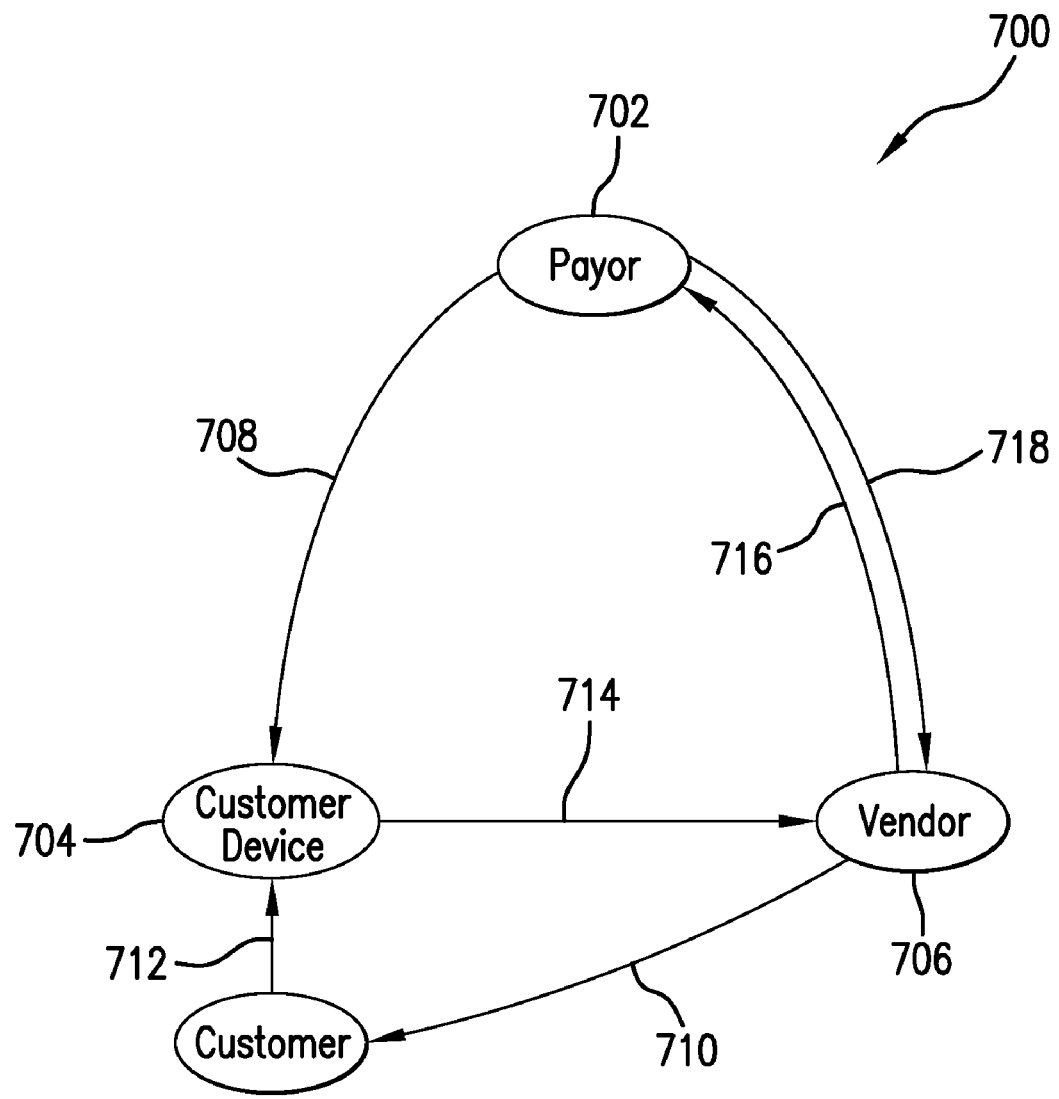
FIG. 7 is a schematic diagram of a system in accordance with another exemplary embodiment of the present invention.

FIG. 7 is another schematic diagram of a method and system for securing a third-party payment electronic transaction in accordance with another embodiment of the invention of the subject Patent Application. System and method 700 include a payor 702 transmitting at least one transaction token 708 to a customer device 704. The vendor 706 then transmits 710 or merely informs the customer 720 of at least the transaction amount, and potentially the vendor ID. Customer 720 then inputs 712 the transaction amount, and potentially the vendor ID, a personal identification number, and an account number or customer ID number. The customer transaction device 704 then computes this information and issues an electronic voucher 714, transmitting such to the vendor 706. Vendor 706 then transmits the electronic voucher 716 to the payor 702. The Payor, upon verifying the validity of the electronic voucher, signals 718 the approval of the purchase to the vendor, or directly makes payment to the vendor 706.

Figure 8:
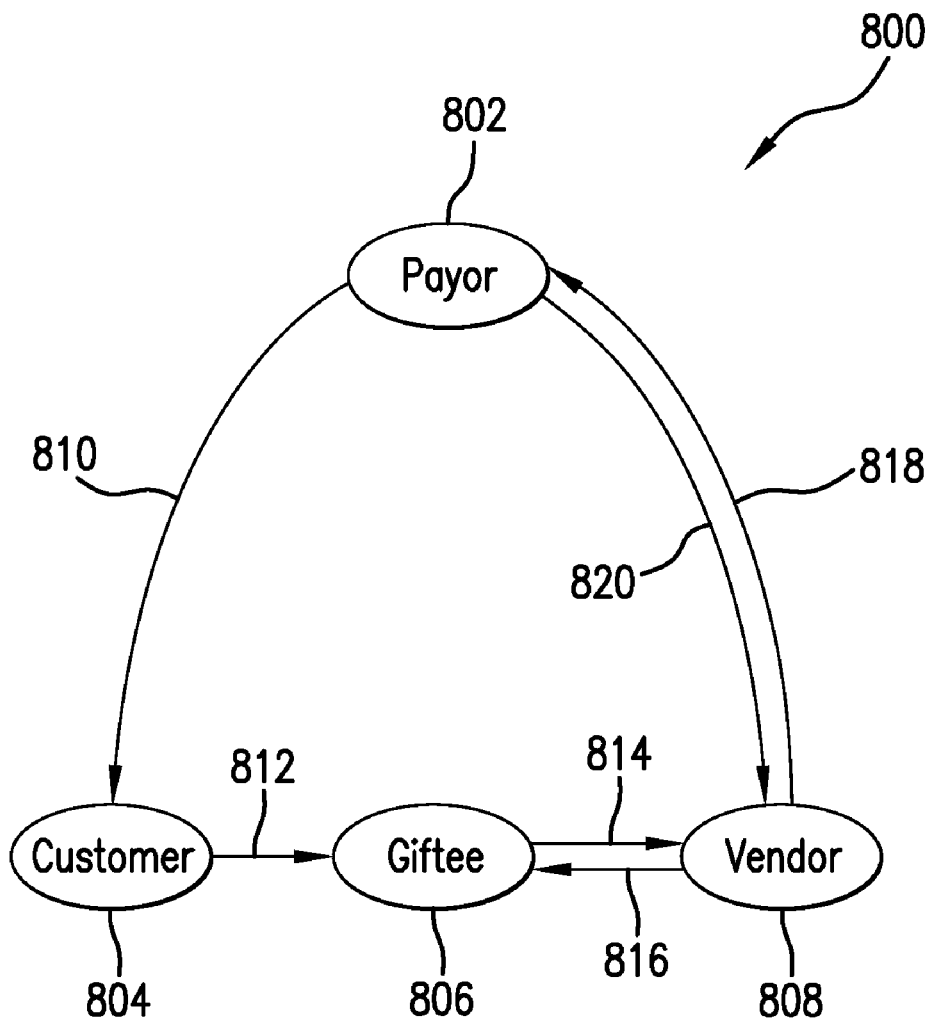
FIG. 8 is a schematic diagram of a system in accordance with another exemplary embodiment of the present invention.

FIG. 8 is a schematic diagram of a method and system for securing a third-party payment electronic transaction in accordance with another embodiment of the invention of the subject Patent Application. System and method 800 show another embodiment wherein a cardholder or customer may give a gift, a metaphoric bundle of money or gift card to a third-party such as a child, spouse, friend, or creditor. Such a third-party may then retransmit, alienate, trade, or use the metaphoric bundle of money to make a purchase. This allows a card holder to give out use of their credit card in a specified amount without jeopardizing the security of their account.

Traditionally, if a parent or friend wanted to give use of their credit card they had to give the credit card number and expiration date to the giftee. This exposed the card holder to the danger that the giftee or anyone who came upon that information would be free to use that credit card up to the credit limit. This situation exposed the cardholder to overcharges, the vendor to fraudulent purchases, and the payor to identity theft or fraud losses. The instant embodiment allows the cardholder the security of easily giving a specified amount to anyone—even an untrusted entity—without fear of abuse or their ability to exceed the amount specified.

In this embodiment, payor 802 issues a transaction token 810 to the customer 804. Customer 804 creates and issues an electronic voucher 812 to a giftee which could be any third-party. This electronic voucher can be transmitted by any means suitable of secure transmission such as an e-mail, displaying barcodes on the screen where the giftee's transaction device may employ a camera to capture and decode the displayed barcode (thereby saving the electronic voucher on the giftee's transaction device), or the customer's transaction device may use any other means such as Bluetooth, WI-FI, infrared strobe, audible chirp, or any other means known in the art to transmit the electronic voucher from the customer 804 to the giftee 806.

Giftee 806 may then freely trade in the electronic voucher. The electronic voucher could be traded from a first giftee to a second giftee to a third giftee to an $n^{th}$ giftee and then the $n^{th}$ giftee may redeem the electronic voucher with a payor 802 or may use the electronic voucher at a vendor 808 transmitted to the voucher at step 814. Alternatively, at any point, any of the giftees could redeem the electronic voucher at an automated teller machine (ATM).

If the intended purchase amount specified by the customer 804 exceeds the purchase price specified by the vendor 808 at the time of purchase, vendor 808 may simply issue cash or a separate electronic voucher 816 back to the giftee 806. For example, if the customer 804 were to issue an electronic voucher for $50.00 to a giftee 806, such as a child, the giftee 806 could buy movie tickets 814 from a vendor 808 such as a movie theater, and the movie theater as vendor 808 may then simply issue the change 816 in cash or some other negotiable instrument to the giftee 806.

Vendor 808 would then transmit the electronic voucher at step 818 to the payor 802 and, upon confirmation of the validity of the electronic voucher, payor 802 would signal approval 820 to the vendor 808.

Figure 9:
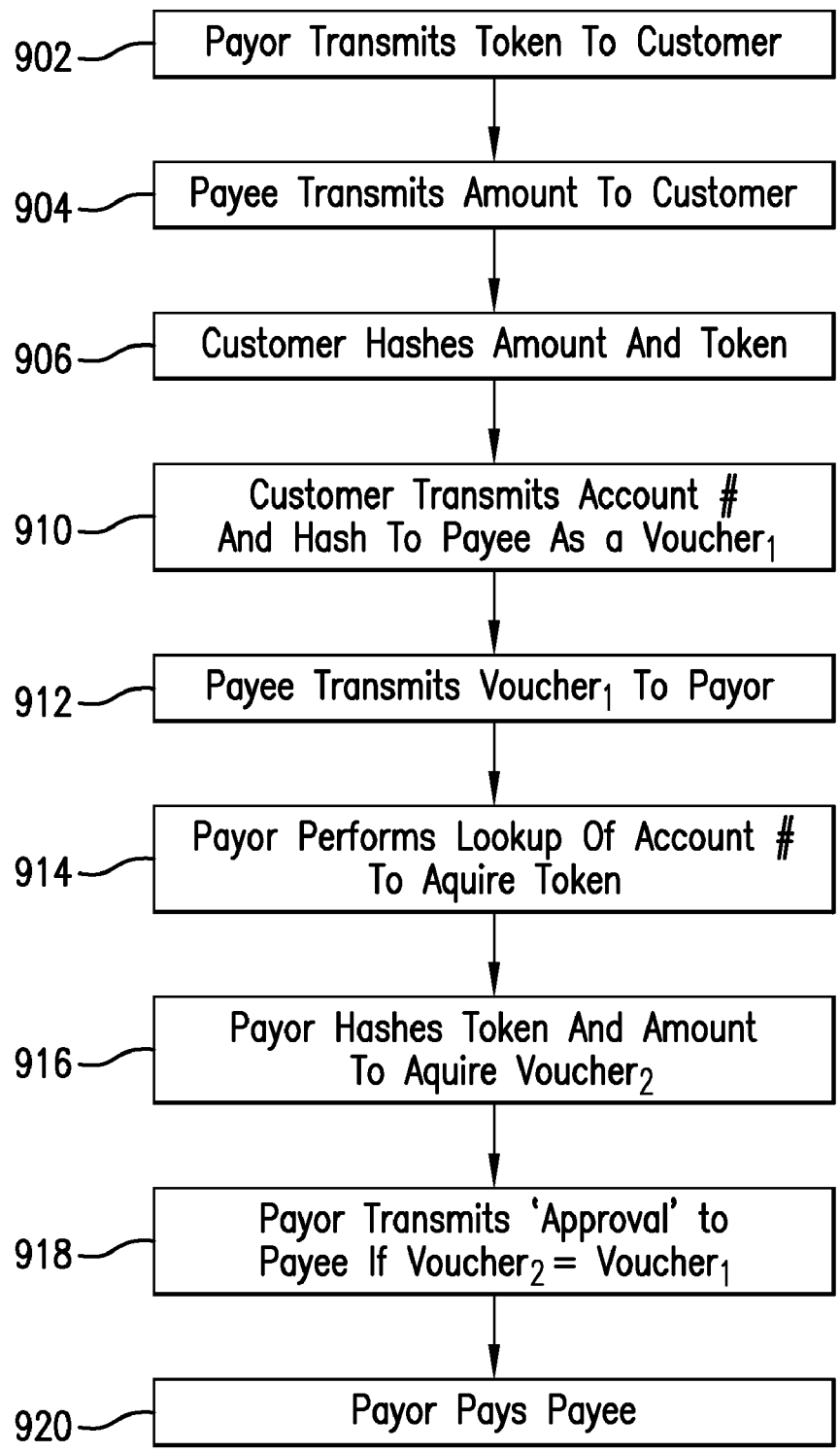
FIG. 9 is a flow diagram of a method for securing a third-party payment electronic transaction in accordance with an exemplary embodiment of the present invention.

FIG. 9 is a simplified flow diagram of a method for securing a third-party payment electronic transaction in accordance with an exemplary embodiment of the present invention. At step 902 a payor transmits a token to a customer. To ensure constant availability of the system, even in areas with low signal, or areas that a customer may not be able to get cell phone or network coverage, the payor may transmit a plurality of (preferably at least 3 or 4) transaction tokens to the customer. The customer will then, even in the event of no network connection, still be able to make several transactions using the pre-stored transaction tokens without connecting to the network.

At step 904 a payee specifies a purchase amount to the customer. At step 906 the customer hashes (using a suitable hash algorithm such as SHA-1) the combination of at least the amount specified by the payee and the transaction token received from the payor. At step 910, the customer transmits an electronic voucher comprising an account number and the hashed value of the amount and the transaction token to the payee. At step 912 the payee transmits the electronic voucher (voucher1) to the payor. At step 914 the payor performs a look-up of the account number that was transmitted in plain text in the electronic voucher to acquire the transaction token or at least one of the first outstanding transaction tokens. At step 916 the payor preferably performs a symmetric (meaning equal to or equivalent to the hashing or computation that the customer transaction device performed on the token number and the amount) to arrive at the same authentication code, represented as voucher2.

At step 918 the payor transmits 'approval' to the payee if voucher2 is equal to voucher1. At step 920 the payor pays the payee in accordance with the specified amount in the electronic voucher.

In another embodiment, to increase security, the customer may incorporate a pin number or personal identification number into the hashing or computation of the electronic voucher. In such an instance the customer inputs a pin which is any suitable alphanumeric combination to evince the fact that the customer is authorizing the transaction. This pin number is combined in with the transaction token and the intended amount and then hashed and combined with the account number and purported amount to arrive at the electronic voucher.

Optionally, the pin code entry may be omitted, and instead a default value, such as '0000' may be transmitted. In this instance, the electronic voucher may operate in debit-card mode where a pin has been omitted (or default pin automatically supplied) which allows for a default transaction amount, for example up to $25.00. This facilitates easy and convenient micro transactions quickly without additional effort on the part of the customer. In such an embodiment the pin can be merely omitted, a default value provided automatically, or the security measures integral to the customer transaction device may be relied upon. Such security measures integral to the customer transaction device may include the aforementioned password, pin, or biometrics upon engaging the customer transaction device.

In another embodiment, a customer may specify a zero dollar amount. This zero dollar amount may signify to the payor that this is an indeterminate amount or that the amount may be determined later. Such an option may be useful in the event of reserving a hotel room, renting a car, or starting a tab at a bar.

In yet another optional embodiment, two customers may exchange an agreed upon contract or business document signed with respectively computed authentication codes to signal their respective acceptance. In such an embodiment, each customer's pin would preferably be incorporated into the hash or computation of the respective authentication code. Such an embodiment would provide a quasi-notary public function where it may be empirically demonstrated that the agreed-upon contract was unchanged from it's considered form, and that each signatory thereto had possession of their respective customer transaction device, pin code, and transaction token—and gave consent or acceptance to the considered contract.

Figure 10:
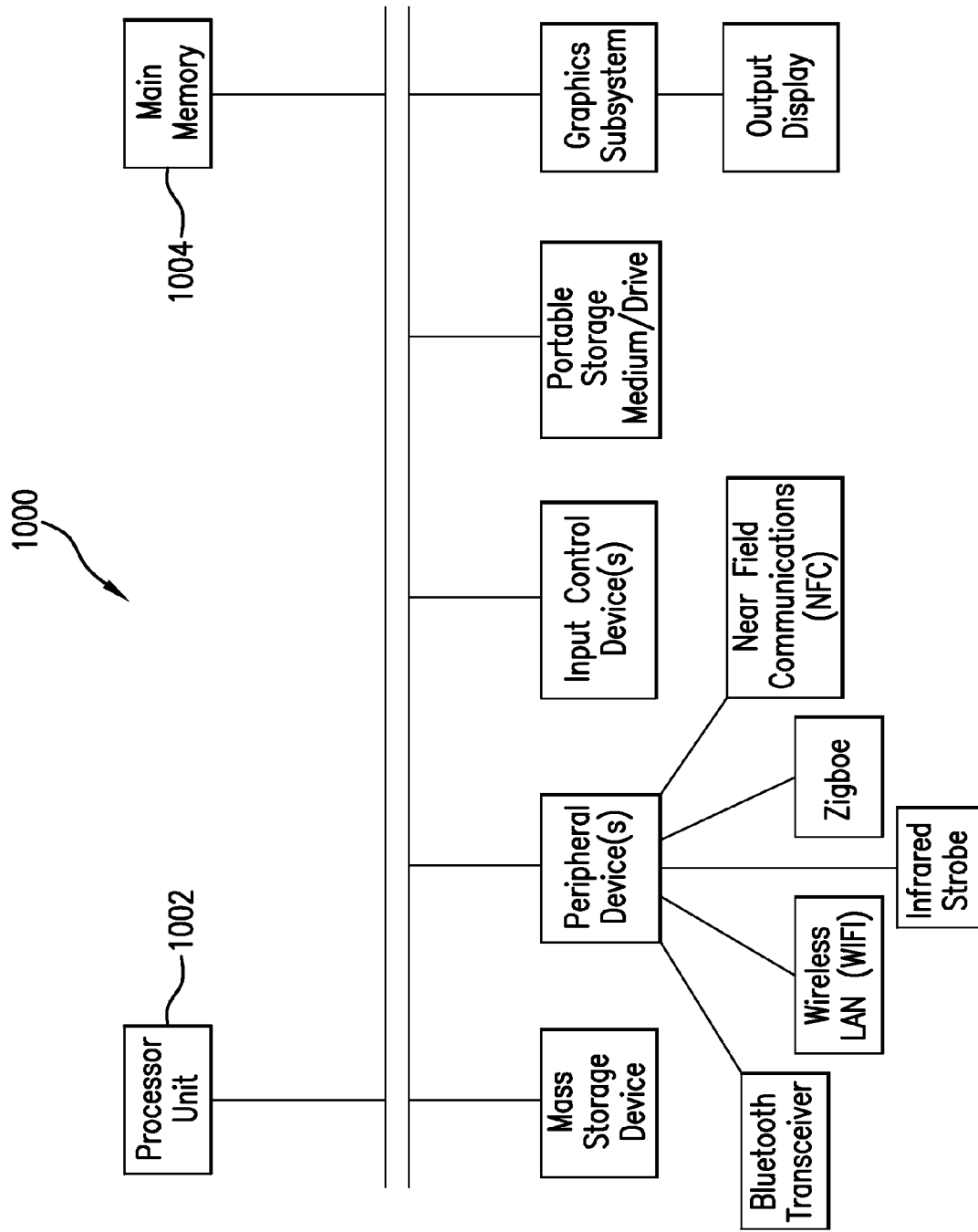
FIG. 10 is a schematic diagram of a system in accordance with another exemplary embodiment of the present invention.

FIG. 10 illustrates a block diagram of an exemplary computer system such as the customer transaction device, the point-of-sale vendor processor, or the payor processor for executing secured electronic transactions, in accordance with various embodiments of the present invention. The computer system 1000 contains a processor unit 1002, a main memory 1004, an interconnect bus 1006, a mass storage device 1008, peripheral device(s) 1010, input control device(s) 1012, portable storage drive(s)/medium 1014, a graphics subsystem 1016, and an output display 1018. Peripheral device(s) 1010 may include at least one of a Bluetooth transceiver 10101, wireless LAN (Wi-Fi) 10102, infrared strobe 10103, zigbee 10104, and Near Field Communication (NFC) 10105. Processor unit 1002 may include a single microprocessor or a plurality of microprocessors for configuring computer system 1000 as a multi-processor system. Main memory 1004 stores, in part, instructions and data to be executed by processor 1002. Main memory 1004 preferably includes banks of dynamic random access memory (DRAM) as well as high-speed cache memory.

For the purpose of simplicity, the components of computer system 1000 are connected via interconnect bus 1006. However, computer system 1000 may be connected through one or more data transport means. For example, processor unit 1002 and main memory 1004 may be connected via a local microprocessor bus and mass storage device 1008, peripheral device(s) 1010, portable storage medium/drive(s) 1014, and graphic subsystem 1016 may be connected via one or more input/output (I/O) buses. Mass storage device 1008, which may be implemented with a magnetic disk drive, an optical disk drive, a solid state device (SSD), or an attachment to network storage, is a non-volatile storage device for storing data, databases, and instructions to be used by processor unit 1002. In a software embodiment, mass storage device 1008 may store the software to load it into main memory 1004.

Portable storage medium drive 1014 operates in conjunction with a portable non-volatile storage medium such as a floppy disk, a compact disk read only memory (CD-ROM), or a digital versatile disk read only memory (DVD-ROM), to input and output data and code to and from the computer system 1000. In one embodiment, the software is stored on such a portable medium, and is input to computer system 1000 via portable storage medium drive 1014. Peripheral device(s) 1010 may include any type of computer support device such as input/output (I/O) interface, to add additional functionality to computer system 1000. For example, peripheral device(s) 1010 may include a network interface card to interface computer system 1000 to a network, or a Bluetooth transceiver, wireless LAN, infrared strobe, zigbee transceiver, near field communication (NFC), RFID reader, audible chirp, or any other known peripheral device.

Input control device(s) 1012 provides a portion of the user interface for a computer system 1000. Input control device(s) 1012 may include an alphanumeric keypad for inputting alphanumeric and other key information; and a cursor control device such as a mouse, a track pad, touch screen, or stylus; or cursor direction keys.

In order to display textual and graphical information, computer system 1000 contains graphic subsystem 1014 and output display(s) 1018. Output display 1018 may include a cathode ray tube (CRT) display, liquid crystal display (LCD), plasma, e-ink, e-paper, transflective, or active matrix organic light emitting diode (AMOLED) display. Graphic subsystem 1016 receives textual and graphical information and processes the information for output to display 1018.

In a software implementation, the electronic transaction software includes a plurality of computer executable instructions, to be implemented on a computer system. Prior to loading in the computer system, the electronic transaction software may reside as encoded information on a computer readable tangible medium such as a magnetic floppy disk, a magnetic tape, CD-ROM, DVD-ROM, flash memory, or any other suitable computer readable medium.

In a hardware implementation, such a system may be implemented in any suitable computer based platform known in the art. For example, the system may comprise suitable storage media and one or more dedicated processors or share one or more processors executing, controlling other functions, wherein the employed processor(s) is programmably configured with processor instructions for performing the functions described herein. Suitable circuits may also be developed to execute certain aspects of these functions.

Figure 11:
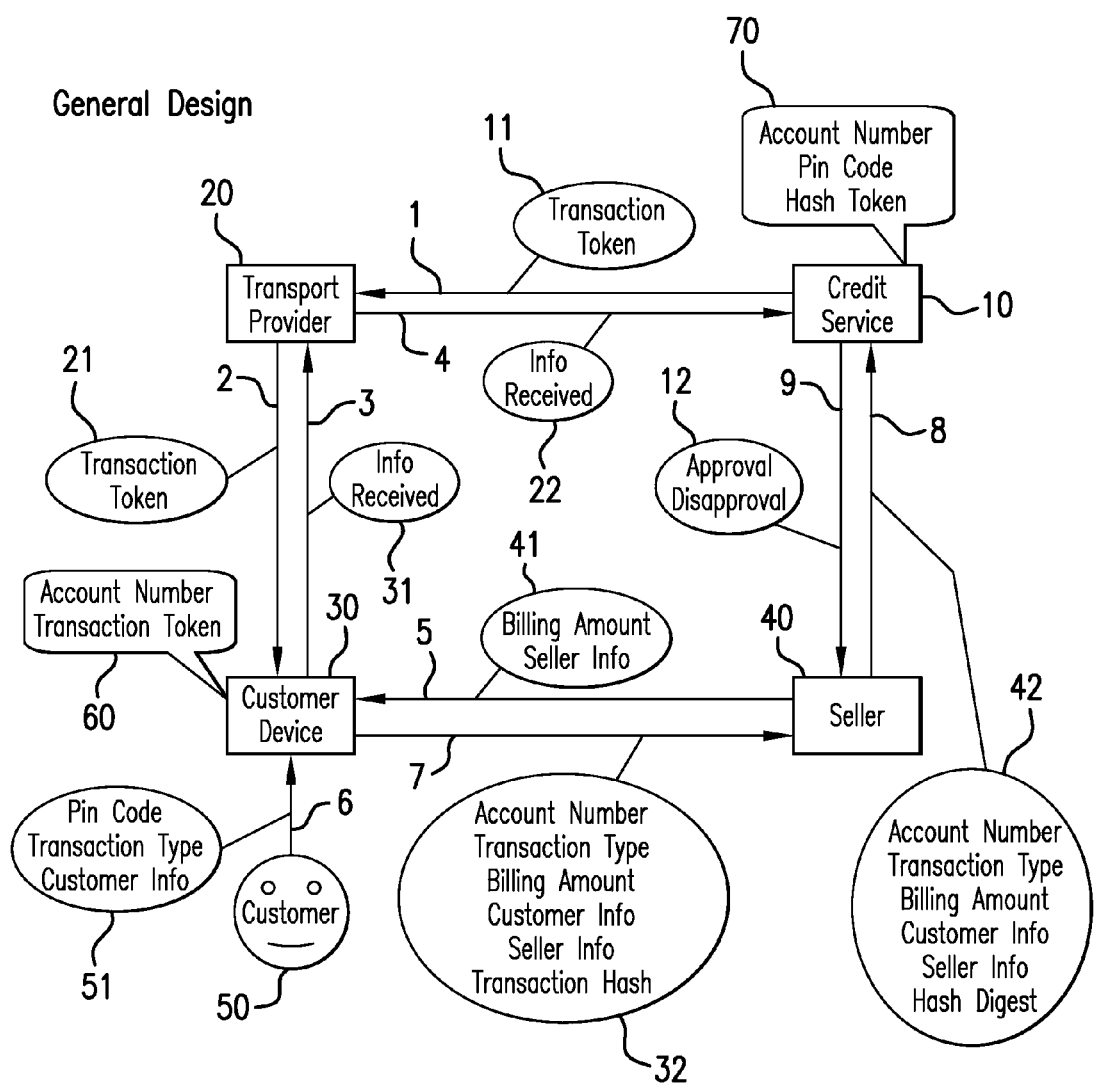
FIG. 11 is a more detailed schematic diagram of a system in accordance with another exemplary embodiment of the present invention.

FIG. 11 shows a Transaction Token 11 being transmitted at step 1 from a Credit Service 10 to a Transport Provider 20. Transport Provider 20 forwards at step 2, the Transaction Token 21 to the Customer Device 30. An Info Received message 31 is transmitted at an acknowledgement stage 3 through Transport Provider 20 and the Info Received message 22 is forwarded at acknowledgement 4 back to the originating Credit Service 10. The Seller 40 then provides at step 5 a billing amount and seller info 41 to the Customer Device 30. At step 6, a Customer 50 enters information 51 potentially including: a pin code, transaction type, and/or customer info . . . etc. The entered info is combined with information 70 sent by the Credit Service 10 and information 60 retained by Customer Device 30. The Customer Device 30 then transmits to Seller 40 at step 7 such information 32 as: Account Number, Transaction Type, Billing Amount, Customer Info, Seller Info, and Transaction Hash . . . etc. as an electronic voucher or E-gift. Seller 40 retransmits at step 8 to the Credit Service 10 the electronic voucher or E-gift including such information

42 as: Account Number, Transaction Type, Billing Amount, Customer Info, Seller Info, and/or Hash Digest . . . etc. Credit Service 10 transmits to Seller 40 at step 9 an Approval or Disapproval message 12 back to Seller 40.

Figure 12:
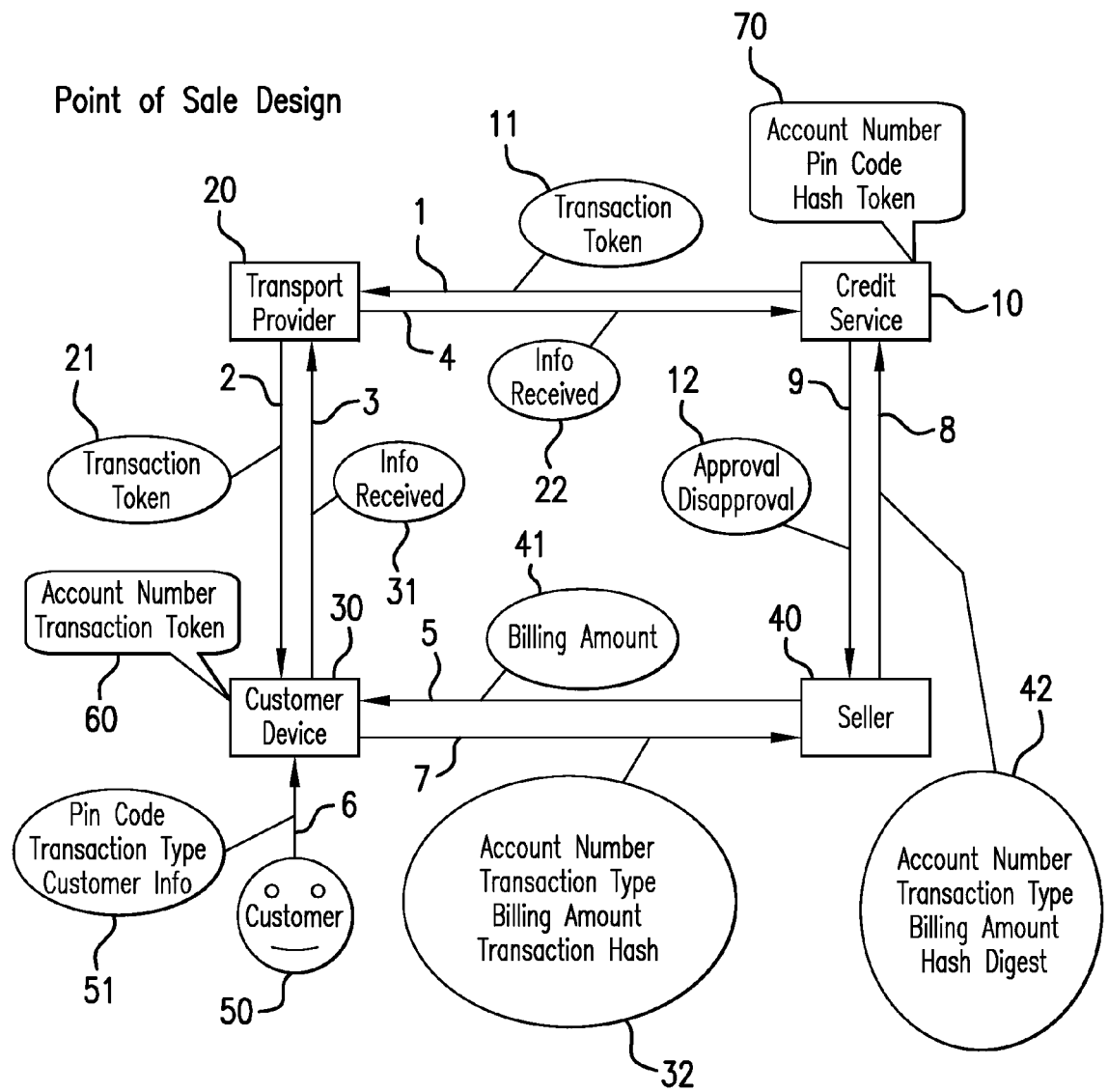
FIG. 12 is a more detailed schematic diagram of a system in accordance with another exemplary embodiment of the present invention.

FIG. 12 shows a Point of Sale Design where a Transaction Token 11 being transmitted at step 1 from a Credit Service 10 to a Transport Provider 20. Transport Provider 20 forwards at step 2, the Transaction Token 21 to the Customer Device 30. An Info Received message 31 is transmitted at an acknowledgement stage 3 through Transport Provider 20 and the Info Received message 22 is forwarded at acknowledgement 4 back to the originating Credit Service 10. The Seller 40 then provides at step 5 a billing amount and seller info 41 to the Customer Device 30. At step 6, a Customer 50 enters information 51 potentially including: a pin code, transaction type, and/or customer info. The entered info is combined with information 70 sent by the Credit Service 10 and information 60 retained by Customer Device 30. The Customer Device 30 then transmits to Seller 40 at step 7 such information 32 as: Account Number, Transaction Type, Billing Amount, Customer Info, Seller Info, and Transaction Hash as an electronic voucher or E-gift. Seller 40 transmits at step 8 to the Credit Service 10 such information 42 as: Account Number, Transaction Type, Billing Amount, Customer Info, Seller Info, and/or Hash Digest. Credit Service 10 transmits to Seller 40 at step 9 an Approval or Disapproval message 12 back to Seller 40.

Figure 13:
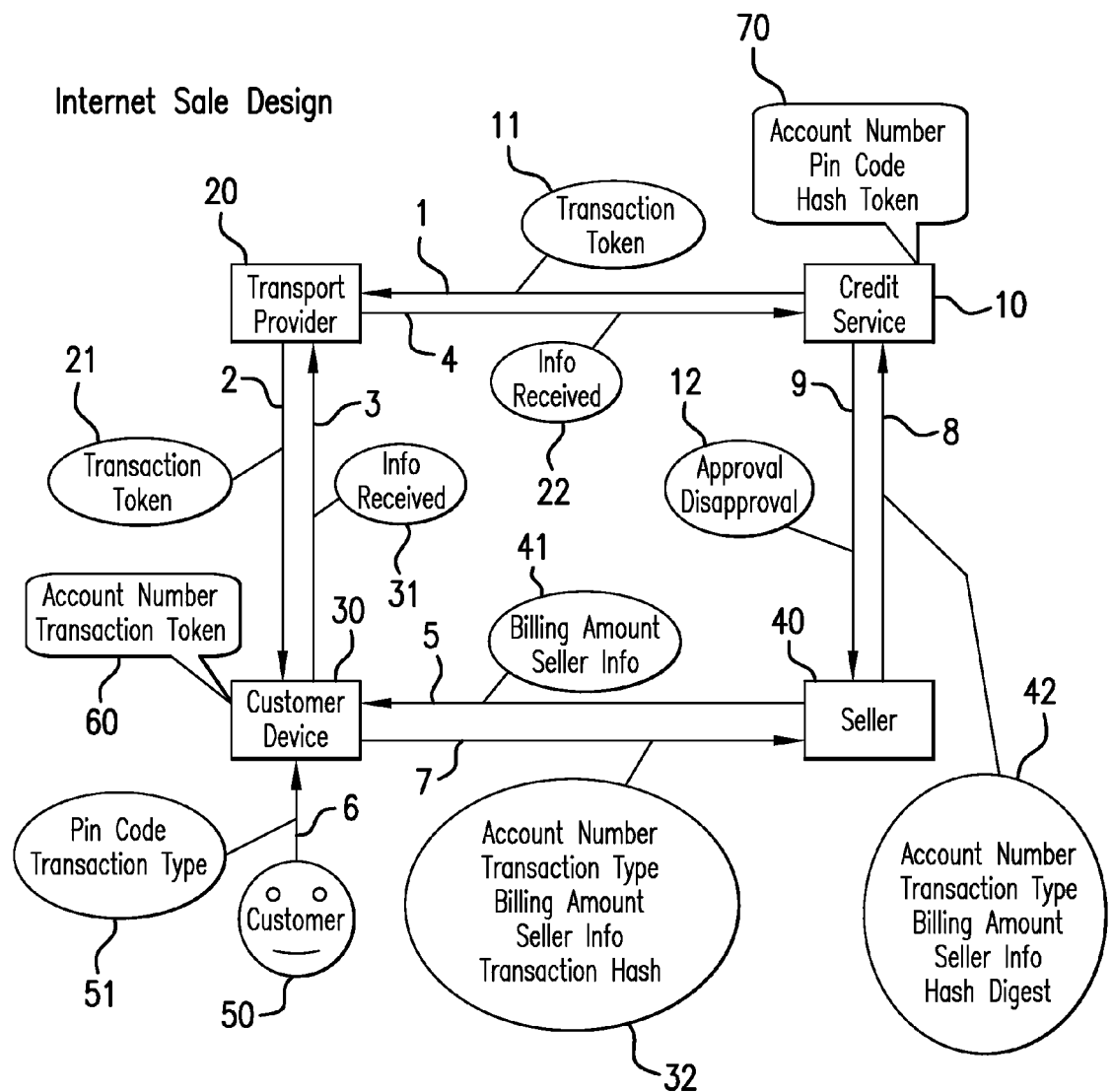
FIG. 13 is a more detailed schematic diagram of a system in accordance with another exemplary embodiment of the present invention.

FIG. 13 shows an Internet Sale Design where a Transaction Token 11 being transmitted at step 1 from a Credit Service 10 to a Transport Provider 20. Transport Provider 20 forwards at step 2, the Transaction Token 21 to the Customer Device 30. An Info Received message 31 is transmitted at an acknowledgement stage 3 through Transport Provider 20 and the Info Received message 22 is forwarded at acknowledgement 4 back to the originating Credit Service 10. The Seller 40 then provides at step 5 a billing amount and seller info 41 to the Customer Device 30. At step 6, a Customer 50 enters information 51 potentially including: a pin code, and/or transaction type. The entered info is combined with at least a portion of information 70 sent by the Credit Service 10 and/or information 60 retained by Customer Device 30. The Customer Device 30 then transmits to Seller 40 at step 7 such information 32 as: Account Number, Transaction Type, Billing Amount, Customer Info, Seller Info, and Transaction Hash as an electronic voucher or E-gift. Seller 40 transmits at step 8 to the Credit Service 10 such information 42 as: Account Number, Transaction Type, Billing Amount, Customer Info, Seller Info, and/or Hash Digest. Credit Service 10 transmits to Seller 40 at step 9 an Approval or Disapproval message 12 back to Seller 40.

Figure 14:
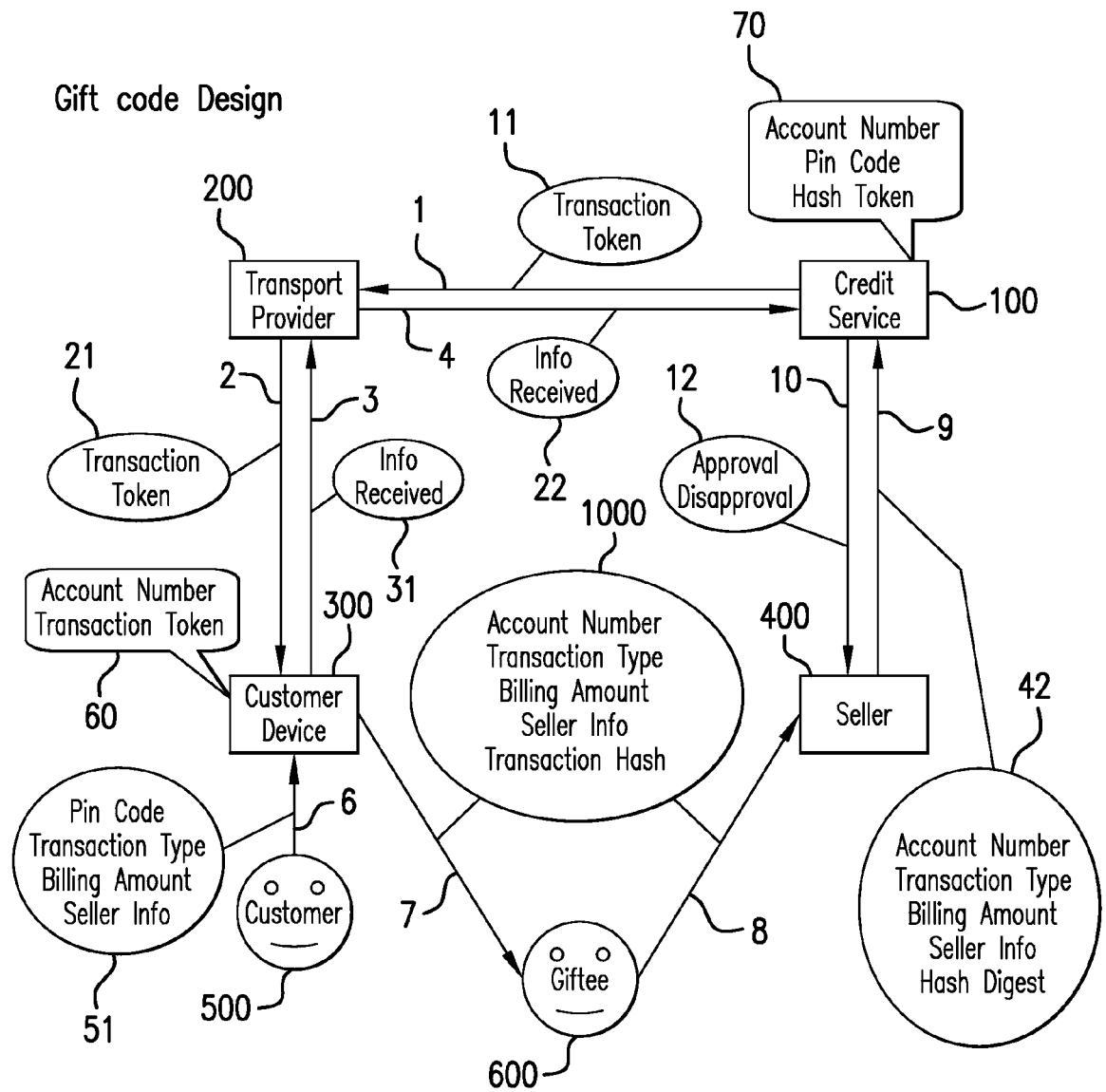
FIG. 14 is a more detailed schematic diagram of a system in accordance with another exemplary embodiment of the present invention.

FIG. 14 shows a Gift Code Design where a Transaction Token 11 being transmitted at step 1 from a Credit Service 100 to a Transport Provider 200. Transport Provider 200 forwards at step 2, the Transaction Token 21 to the Customer Device 300. An Info Received message 31 is transmitted at an acknowledgement stage 3 through Transport Provider 200 and the Info Received message 22 is forwarded at acknowledgement 4 back to the originating Credit Service 100. At step 6, a Customer 500 enters information 51 into Customer Device 300, potentially including: a pin code, billing amount, seller info, and/or transaction type. The entered info is combined with at least a portion of information 70 sent by the Credit Service 10 and/or information 60 retained by Customer Device 300. The Customer Device 300 then transmits to Giftee 600 at step 7 such information 32 as: Account Number, Transaction Type, Billing Amount, Customer Info, Seller Info, and Transaction Hash. At Step 8, Giftee 600 redeems the Gift Code/Electronic Voucher to a Seller 400. Giftee may instead redeem such Gift Code or Electronic Voucher at a Credit Service 100, ATM, elsewhere, or my freely trade or alienate the Gift Code or Electronic Voucher. Seller 400 transmits at step 9 to the Credit Service 100 such information 42 as: Account Number, Transaction Type, Billing Amount, Customer Info, Seller Info, and/or Hash Digest. Credit Service 100 transmits to Seller 400 at step 10 an Approval or Disapproval message 12 back to Seller 400.

Figure 15:
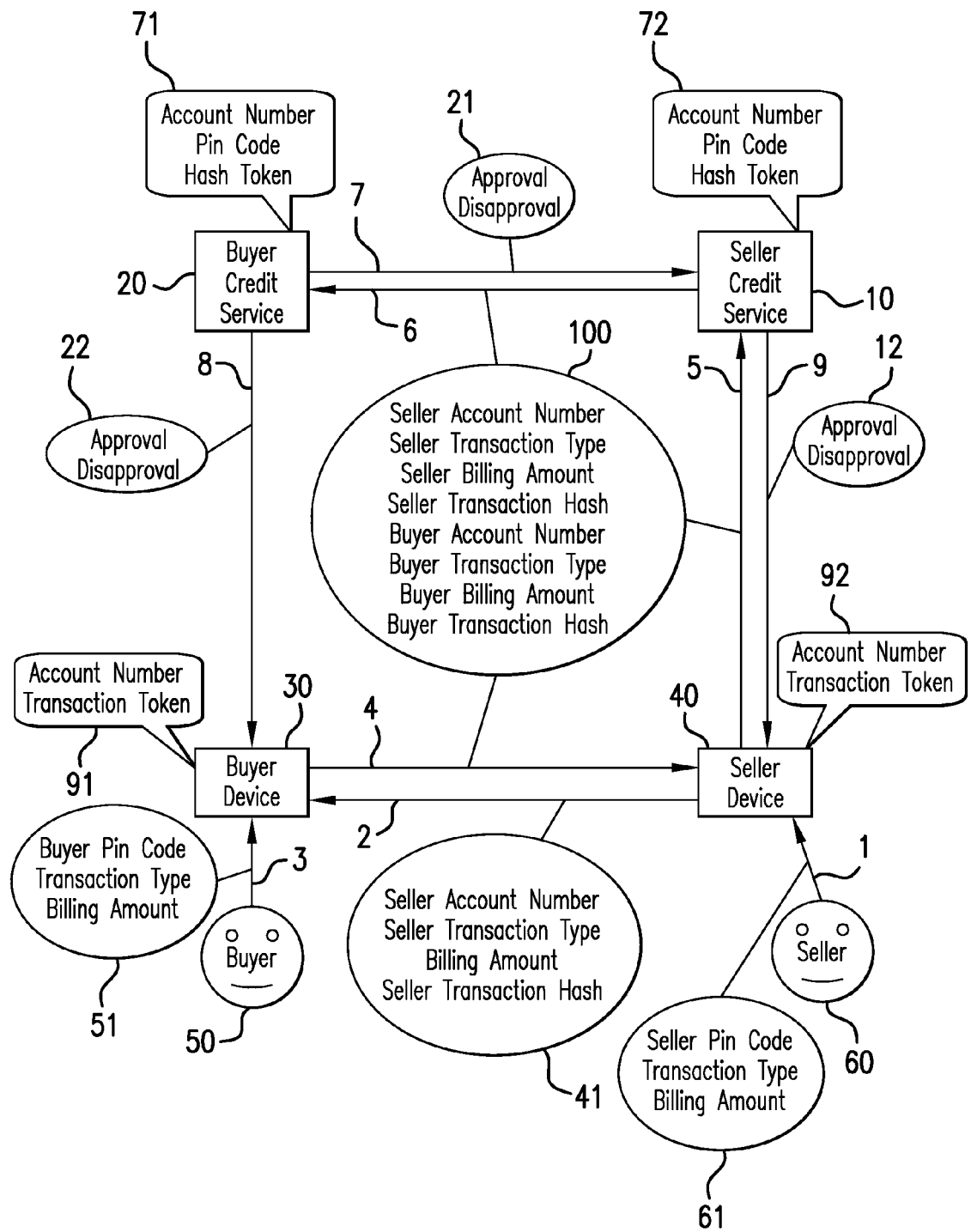
FIG. 15 is a more detailed schematic diagram of a system in accordance with another exemplary embodiment of the present invention.

FIG. 15 shows a Person to Person Design where a Seller 60 inputs information 61 such as Seller Pin Code, Transaction Type, and/or Billing Amount at step 1 into a Seller Device 40 which transmits at step 2 information 41 such as seller account number, seller transaction type, billing amount, and/or seller transaction hash to buyer device 30. Buyer 50 then enters information 51, such as: buyer pin code, transaction type, and/or billing amount at step 3 to the buyer device 30. Buyer Device 30 then transmits a Gift Code or Electronic Voucher containing at least a portion of the entered information to the seller device 40 at step 4. Seller Device 40 then forwards this Gift Code or Voucher at step 5 to the Seller Credit Service 10 which forwards the Gift Code or Voucher at step 6 to the Buyer Credit Service 20. Buyer Credit Service 20, at step 7, sends an Approval/Disapproval message 21 back to the Seller Credit Service 10. Buyer Credit Service 20 is also responsible for transmitting an Approval/Disapproval message 22 back to the Buyer Device 30.

Thereby a customer and vendor with minimal effort, expended time, or additional hardware/software or changes thereto, may have an automated system and method for securing such third party payment electronic transaction.

Although this invention has been described in connection with specific forms and embodiments thereof, it will be appreciated that various modifications other than those discussed above may be resorted to without departure from the spirit or scope of the invention. For example, equivalent elements may be substituted for those specifically shown and described, certain features may be used independently of other features, and in certain cases particular combinations of circuit design and implementation flows or processing steps may be reversed or interposed, all without departing from the spirit or scope of the invention as defined in the appended Claims.

What is being claimed is:

1. A method for securing a third party payment electronic transaction comprising:
   electronically maintaining a third party payment account between a payor device and a customer;
   programmably configuring a customer transaction device, the customer transaction device communicating with a payee transaction device;
   the payor device delivering an electronic transaction token from the payor to the customer transaction device;
   the customer transaction device generating a first validation code based on customer-possessed information including at least: the electronic transaction token and a first version of a transaction amount; and, including the first validation code in a first portion of an electronic voucher and transmitting to the payee transaction device;
   the payee transaction device adding a second version of the transaction amount in a second portion of the electronic voucher;
   the payee transaction device transmitting the electronic voucher to the payor device;
   the payor device receiving the electronic voucher and independently generating a second validation code for the customer based at least on the electronic transaction token and the second version of the transaction amount; and, validating by a processor a transaction amount for payment from the payor to the payee, the validation including comparing the second validation code with the first validation code.

2. The method as recited in claim 1, further comprising disbursing the payment amount from the payor to the payee responsive to a match between said first and second validation codes.

3. The method as recited in claim 1, wherein the generation of the first and second validation codes includes executing a hashing operation on a combination of at least the corresponding first or second version of the transaction amount, the electronic transaction token and a personal identification number (PIN).

4. The method as recited in claim 3, wherein the hashing operation utilizes Hash-based Message Authentication Codes (HMAC).

5. The method as recited in claim 1, wherein an electronic voucher is issued to the payee transaction device, the electronic voucher being redeemable for payment from the payor.

6. The method as recited in claim 1, wherein the payor delivers a plurality of electronic transaction tokens to the customer to be stored on the customer transaction device.

7. The method as recited in claim 1, wherein the customer transaction device transmits the first validation code to the payee transaction device via a transmission method selected from at least one of the following: barcode, Bluetooth, Wi-Fi, zigbee, infrared modulation, visible LED modulation, haptic modulation, user spoken sequence, Radio Frequency IDentification (RFID), and Near Field Communication (NFC).

8. The method as recited in claim 1, wherein the payor transmits the electronic transaction tokens to the customer transaction device via a transmission method selected from one of the following: Multimedia Messaging Service (MMS), Short Messaging Service (SMS), and secure SMS.

9. The method as recited in claim 1, wherein the payor provides the electronic transaction tokens to the customer transaction device via an independent transport provider.

10. The method as recited in claim 7, wherein the first validation code is truncated to conform to Electronic Data Interchange (EDI) standards.

11. A system for securing a third party payment electronic transaction comprising:
a payor unit including a processor, and a nontransitory computer readable medium storing executable instructions that when executed cause the payor processor to perform the steps of: establishing a third party payment account between the payor and a customer, and delivering an electronic transaction token to a customer transaction device;
a programmably configured customer transaction device including a processor and a nontransitory computer readable medium having executable instructions that when executed cause the customer transaction device processor to perform the steps of: generating a first validation code based on customer-possessed information including at least: the electronic transaction token and a first version of a transaction amount; and, including the first validation code in a first portion of an electronic voucher and causing transmission to the payee transaction device; and,
a payee point of sale unit including a processor, and a nontransitory computer readable medium having executable instructions that when executed cause the payee point of sale processor to perform the steps of: adding a second version of the transaction amount in a second portion of the electronic voucher; and, causing transmission of the electronic voucher to the payor unit;
wherein the nontransitory computer readable medium of the payor unit further includes executable instructions that when executed cause the payor processor to perform the steps of: receiving the electronic voucher and independently generating a second validation code for the customer based at least on the electronic transaction token and the second version of the transaction amount; and, validating a transaction amount for payment from the payor to the payee, the validation including comparing the second validation code with the first validation code.

12. The system as recited in claim 11, wherein the nontransitory computer readable medium of the payor unit further includes executable instructions that when executed cause the payor processor to perform the step of: disbursing the payment amount to the payee responsive to a match between said first and second validation codes.

13. The system as recited in claim 11, wherein the generation of the first and second validation codes by the customer transaction device and payor unit respectively include executing a hashing operation on a combination of at least the corresponding first or second version of the transaction amount, the electronic transaction token, and a personal identification number (PIN).

14. The system as recited in claim 11, wherein the electronic voucher is redeemable for payment from the payor.

15. The system as recited in claim 11, wherein the customer transaction device has a memory to maintain a plurality of electronic transaction tokens the payor unit provides to the customer transaction device.

16. The system as recited in claim 11, wherein the customer transaction device includes a transmission module transmitting the first validation code to the payee point of sale unit, the transmission module including at least one device selected from the following: a screen of the customer transaction device, a Bluetooth transceiver, a Wi-Fi transceiver, a zigbee transceiver, an infrared light modulator, a visible light modulator, a haptic modulator, a Radio Frequency IDentification (RFID) transceiver, and a Near Field Communication transceiver (NFC).

17. The system as recited in claim 11, wherein the nontransitory computer readable medium of the payor unit further includes executable instructions that when executed cause the payor processor to perform the step of: causing transmission of the transaction tokens to the customer transaction device via a transmission type selected from the following: Multimedia Messaging Service (MMS), Short Message Service (SMS), and secure SMS.

18. The system as recited in claim 11, wherein the payor unit provides transaction tokens to the customer transaction device via an independent transport provider.

19. The system as recited in claim 13, wherein the hashing operation utilizes Hash-based Message Authentication Code (HMAC).

20. The system as recited in claim 16, wherein the first validation code is truncated to conform to Electronic Data Interchange (EDI) standards.

* * * * *